Feb. 24, 1925.
G. A. HASSEL
APPARATUS FOR TESTING MATERIALS
Filed May 28, 1920
1,527,409
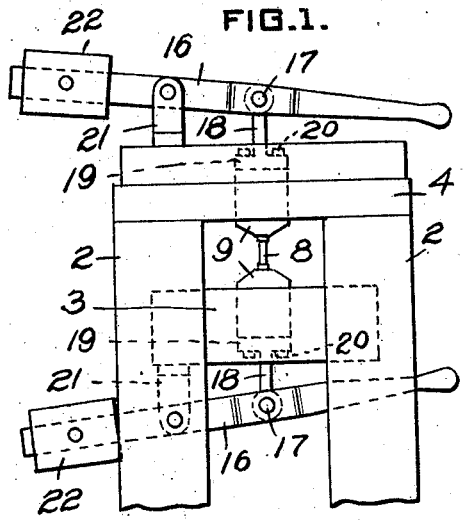
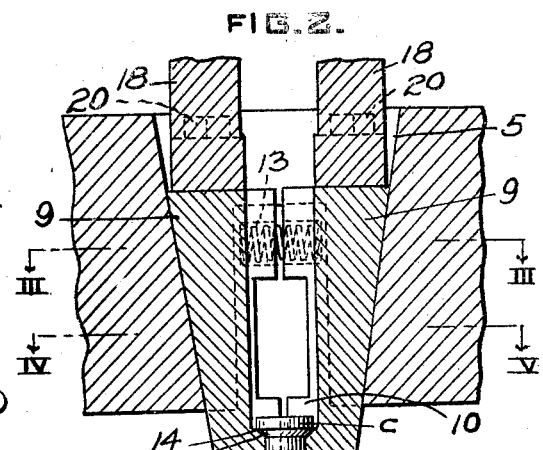
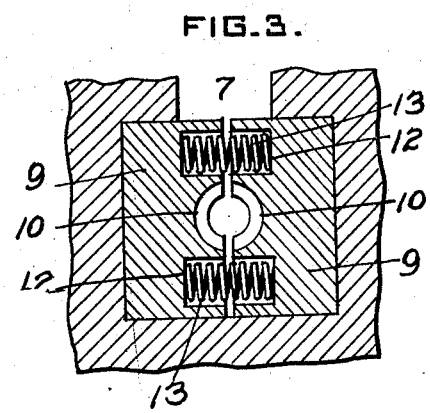
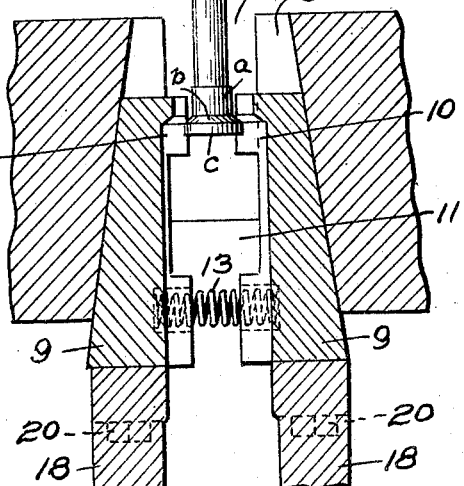
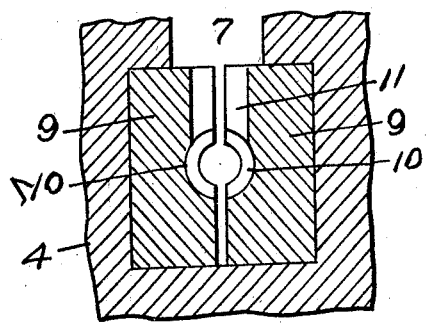
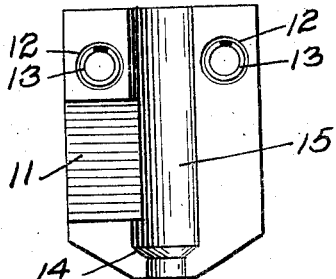
WITNESSES
INVENTOR Patented Feb. 24, 1925.

1,527,409

UNITED STATES PATENT OFFICE.

GUSTAV A. HASSEL, OF McKEESPORT, PENNSYLVANIA.

APPARATUS FOR TESTING MATERIALS.

Application filed May 28, 1920. Serial No. 384,793.

*To all whom it may concern:*

Be it known that I, GUSTAV A. HASSEL, a citizen of the United States, residing at McKeesport, in the county of Allegheny and State of Pennsylvania, have invented certain new and useful Improvements in Apparatus for Testing Materials, of which the following is a specification.

My invention relates to a new and improved method of and apparatus for testing the strength of materials, such for example, as metallic members.

In the operation of testing materials, as heretofore practiced, and particularly the tensile strength, a test specimen has been prepared by either threading its ends or providing it with enlarged ends, and then placing the test specimen in a testing machine in which the ends of the specimen are rigidly gripped by grip or clamping devices.

This method of rigidly gripping the ends of the test specimen during the test is objectionable and, further, the time and labor expended in preparing the test piece has been considerable.

A still further objectionable feature encountered under the present method of and apparatus employed for testing is due to the construction of the gripping or test piece clamping members and the cooperating testing machine parts; that is to say, on account of the construction, considerable time and labor is required in placing the specimen in position for the test and removing it from the machine.

My invention is designed to overcome the objectionable features above referred to, and among the objects of the present invention are, to provide a method of testing the strength of a member or article without rigidly or tightly gripping or clamping the member being tested; to provide simple and efficient means for maintaining the test specimen in the desired position in the testing machine, said means constructed and adapted for readily placing the specimen in position and removing it from the machine; and to provide a new and improved construction and combination of parts hereinafter described and claimed.

In the accompanying drawings which illustrate apparatus embodying my invention,

Fig. 1 is a side elevational view of a portion of a testing machine showing my invention applied thereto;

Fig. 2, an enlarged detail sectional view particularly showing the test specimen holding or clamping means;

Fig. 3, a horizontal sectional view, the section being taken on line III—III of Fig. 2;

Fig. 4, a view similar to Fig. 3, the section being taken on line IV—IV of Fig. 2; and Fig. 5, an interior face view of one member of a pair of test specimen holding or clamping means.

Referring to the drawings, 2—2 designate uprights or standards of a portion of a testing machine, 3 a vertically movable crosshead, and 4 a fixed cross-head of said machine. As the testing machine per se forms no part of my invention, I deem it unnecessary to fully describe and illustrate the same.

As shown, the respective cross-heads are provided with wedge shaped openings 5 and 6, and 7 represents a laterally extending opening formed in each cross-head and communicating with the wedge shaped openings.

8 designates the test specimen and, as illustrated and as preferred, the test specimen or piece is formed at each of its ends with a head $a$, beveled shoulders or faces $b$, and an annular collar $c$. It will be understood that the operation of shaping the ends of the test specimen, as shown, is much more simple and of less cost than is the case where the ends of the test piece are threaded.

The clamping or test specimen retaining means are designed to be entered in the respective openings 5 and 6 of the cross-heads and are of substantially the same construction, thereby making them interchangeable. Each clamp structure includes two similar wedge shaped members 9—9, each having a central longitudinally extending semi-circular bore 10, an opening 11 extending from a side inwardly and communicating with the bore, and pockets 12 into which are placed the ends of coiled springs 13.

At one end of the bore is a beveled wall 14, the latter forming, when the clamps are assembled, a seat for the beveled shoulder or face of the test specimen. The beveled wall 14 of each part merges into a semi-circular wall 15 adapted to encircle the annular collar $c$ of the test piece.

For the purpose of moving the clamp structures vertically relatively to the clamp receiving openings 5 and 6, I provide each structure with an operating lever 16, the latter being pivotally mounted on a pin 17 supported on standards 18 extending upwardly from a plate 19 secured to the upper end of each clamp section by bolts 20. 21 designates a support carried on the upper fixed cross-head to which the lever 16 is fulcrumed, and 22 represents an adjustable weight mounted on the lever.

The test specimen may be readily placed within the clamp structures by spreading the members slightly and passing the specimen through the opening 7 of each cross-head and the openings 11 of the clamps. It will be understood that the two-part clamp will be automatically separated sufficiently to receive the specimen, by the action of the springs 13, when the clamps are moved outwardly a slight distance in the respective openings 5 and 6.

In Fig. 2, the upper clamp structure is shown closed and loosely clamping or retaining the test specimen, while the lower clamp is shown separated, or in the position to receive or permit the removal of the specimen.

When the parts are in position to subject the specimen to a test, it will be noted that it is not rigidly clamped or gripped, although securely maintained in the desired operative position, with the beveled faces of the specimen in contact with the beveled walls of the clamps, thereby loosely clamping the specimen or the ends thereof, and it will be seen that the specimen is held against movement only in the direction of the testing strain, while it is free to move angularly in other directions, so that it can adjust itself to proper positon if the opposed clamps of the testing device should be slightly out of alinement.

What I claim is:

1. The combination with a testing machine, clamping means thereon adapted to hold specimens that have been provided with heads thereon, said clamping means comprising cooperating jaws for egaging one end of the specimen having an opening therein of greater diameter than the stem of the specimen to be tested and having a recess therein to receive the head of a specimen, the arrangement being such that there may be relative angular movement between the jaws and the specimen when under tension.

2. The combination with a testing machine having a fixed and a movable cross head each provided with a clamp receiving opening and a side opening communicating with the first mentioned opening, a two-part clamp structure located in each of the cross-head openings, each clamp structure having a central bore and a side opening communicating with the bore and registering with the side opening of the cross-head.

3. A test specimen clamping device including a two-part structure having a central bore, springs interposed between the parts and exerting pressure to separate the parts, and a side opening communicating with the central bore.

In testimony whereof I affix my signature in presence of two witnesses.

GUSTAV A. HASSEL

Witnesses:
J. M. GEOGHEGAN,
LOIS WINEMAN.